Sept. 4, 1956
C. COHEN ET AL
2,761,376
CHEESE MAKING APPARATUS AND METHOD
Filed Feb. 29, 1952
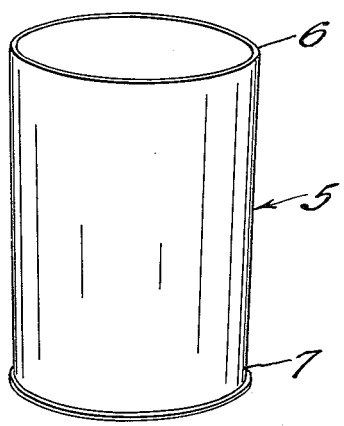
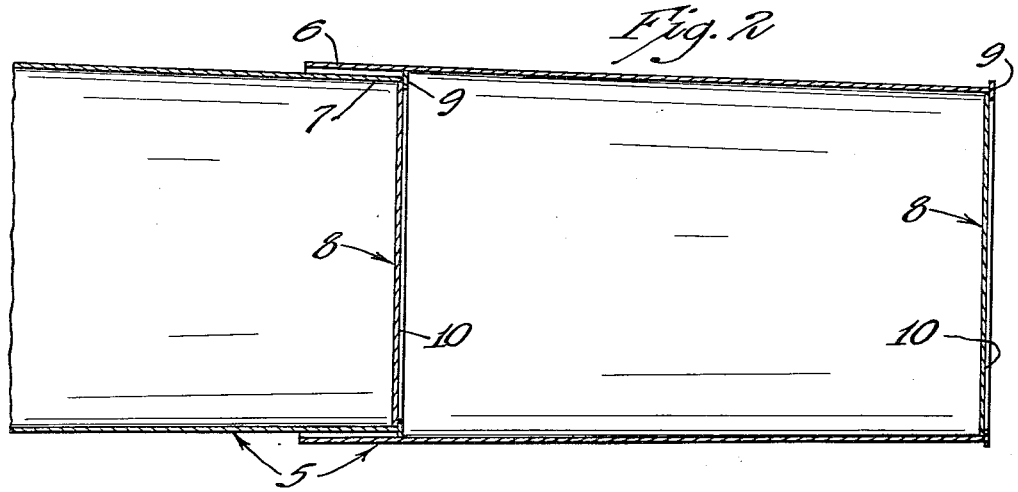
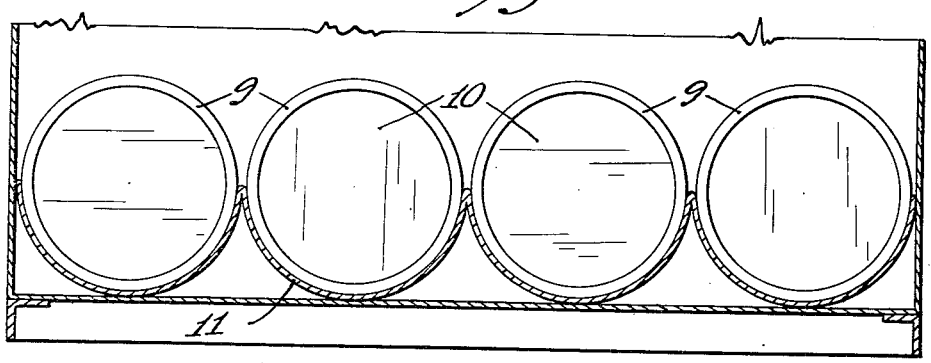
Inventors
Carl Cohen
Marvin L. Cohen
By
Williamson, Williamson, Schroeder & Adams
Attorneys United States Patent Office 2,761,376
Patented Sept. 4, 1956

2,761,376

CHEESE MAKING APPARATUS AND METHOD

Carl Cohen and Marvin L. Cohen, Waupaca, Wis., assignors to Chain-O-Lakes, Inc., Waupaca, Wis., a corporation of Illinois Application February 29, 1952, Serial No. 274,152

7 Claims. (Cl. 100—37)

This invention relates to apparatus for making cheese and is particularly adapted for use in making small cheeses in a simple and speedy manner so that the production of smaller cheeses is economically feasible.

This application is a continuation in part of our co-pending application, Serial No. 133,125, filed December 15, 1949, now Patent Number 2,590,510, granted March 25, 1952 and entitled "Apparatus for Making Cheese." The trays and compression mechanism disclosed and claimed in that application are referred to herein in order to better explain the structures and methods claimed herein. Since the trays and compression mechanism were clearly and completely disclosed in our co-pending application, for the sake of brevity the description and drawing of such apparatus has been omitted herefrom and is hereby incorporated by reference thereto.

This application is intended to cover a structure similar and related to the structure shown in our co-pending application but which makes it possible to eliminate the use of the sleeve required in the cheese hoop shown in that application. It is possible to entirely eliminate the requirement for such a sleeve by building the structure of the cheese hoop itself as disclosed and claimed herein.

It is a general object of our invention to provide novel cheese forming methods and apparatus of cheap and simple construction and practice.

A more specific object is to provide cheese molding apparatus of cheap and simple construction for economically molding cheeses of small size with a minimum of labor and utilizing a conventional cheese press.

A still more specific object of our invention is to provide a flaring type of cheese cup hoop equipped with an exterior flange at the smaller end of the same and with a false bottom therein whereby during the molding of the cheese curd the small end of one cup may be placed within the larger end of another cup and the flange at the smaller end of the first cup in combination with the false bottom will cooperatively act as a follower to compress the cheese curd with a minimum of leakage of curd as the cheeses are compressed in a press.

Another object is to provide novel cheese forming apparatus which will eliminate the need for a separate follower for each hoop during the cheese forming process and which at the same time will eliminate the need for a separate structure to facilitate the removal of the cheeses from the hoops.

Another object is to provide novel and improved cheese molding apparatus wherein the bottom forming structure of the hoop may act to supplant the usual follower and at the same time be utilized to facilitate the extraction of the cheeses from the hoops and thereby eliminate structure and expense required in other cheese forming apparatus.

Another object is to provide a novel and improved method of molding an entire day's supply of cheese within a cheese factory into cheeses of small size with a minimum of labor, time and inconvenience.

These and other objects and advantages of our invention will more fully appear from the following description made in connection with the accompanying drawings, wherein like reference characters refer to similar parts throughout the several views, and in which:

Fig. 1 is a perspective view of one embodiment of our invention;

Fig. 2 is a longitudinal sectional view of two cheese hoops embodying our invention, the smaller end of one of the hoops being positioned within the open larger end of the other in telescoping relation to illustrate the manner in which the two hoops coperate to eliminate the need for a follower; and Fig. 3 is a cross sectional view of a plurality of hoops made in accordance with our invention showing the manner in which they are aranged in trays.

One embodiment of our invention may include, as shown in Figs. 1–3, a frusto-conically shaped hoop indicated generally as 5. As best shown in Figs. 1 and 2, this hoop 5 has a larger open end 6 and a closed smaller end 7. The smaller end 7 is provided with a removable bottom, as best shown in Fig. 2, the bottom being comprised of a thin plate or panel member 8. This plate 8 is of diameter slightly smaller than the internal diameter of the smaller end 7 of the hoop.

Secured to the smaller end 7 of the hoop is an annular flange or ring 9 which, as best shown in Fig. 2, is thin and has an external diameter greater than the external diameter of the smaller end 7. The internal diameter of this flange 8 is less than the diameter of the smaller end 7 so that the flange 9 extends both inwardly and outwardly relative to the small end 7 of the hoop. The external diameter of this flange 9 is slightly less than the internal diameter of the larger open end 6 of the hoop and the internal diameter of the flange is less than the diameter of the plate 8 so that the plate 8 may be positioned within the hoop 5 in abutting relation to the internally extending portion of the flange to form in conjunction therewith a false bottom for the hoop 5. Because of the thin nature of the flange 9 the outer surface of the smaller end of the hoop which is indicated generally as 10 is substantially flat and smooth, the only deviation therefrom being the slight indentation where the inwardly extending portion of the flange 9 terminates. This is important since in use the outer surface 10, which is comprised of the other surface of the plate 8 and the outer surface of the flange 9, forms a follower for the cheese curd in the adjacent hoop and hence the cheese which is formed by the compression of the hoops deviates only slightly from having a flat end. A slight ridge will exist around the one end of the cheese formed within such a hoop.

These hoops are used in conjunction with a tray 11 which is constructed in accordance with the description of the tray shown in our co-pending application referred to above. Mechanism for compression of these hoops longitudinally when they are arranged in telescoping relation is also utilized in the manufacture of cheese with these hoops, but it is felt unnecessary to show such compression mechanism since it is readily understood in the art and is clearly disclosed in our co-pending application.

In use, the plates 8 are positioned within the hoops so that the plate will abut against the internally extending portion of the flange 9 and form in conjunction therewith a false bottom for each hoop. The hoops 5 are then filled completely with the cheese curd and the hoops are arranged so that the smaller end 7 of one hoop will extend into the larger end 6 of an adjacent hoop. Thus, a plurality of hoops 5 are aligned longitudinally in slightly telescoping relation with each other. This is best shown in Fig. 2 except that in Fig. 2 the smaller end has progressed farther than would initially be the case at the commencing of the cheese making process. A plurality of these cheese hoops are placed upon trays 11 in the manner disclosed in our co-pending application and while in such telescoping relation with each other. The trays are then placed into the compressing mechanism disclosed in our co-pending application and the hoops are urged longitudinally of each other into further telescoping relation, as best shown in Fig. 2. The whey will then drain outwardly between the flange 9 and the walls of the hoop 5 for the flange 9 will not approach fitting tightly into the hoop until at the termination of the pressing operation. However, the flange 9 is sufficiently large in diameter to prevent any appreciable amount of curd from slipping outwardly between the flange and the hoop during the pressing operation.

The flange 9 and the plate 8 together form what is in effect a follower for its adjacent cheese hoop and thus the need for a separate follower is entirely eliminated. The outwardly extending flange 9 positively prevents the escape of cheese curd thereby, and together with the plate 8 compresses the cheese toward the smaller end of the hoop as it moves into the larger end of that particular hoop.

After the cheeses have been compressed for a sufficient length of time, the hoops are removed from the compression mechanism and separated from each other. The cheeses may then be readily removed from the hoops 5 by standing them with their open larger end 6 down and pressing downwardly upon the plate 8. The plate 8 will cause the cheese to be loosened and moved downwardly free of the walls of the hoop 5. Thereafter, after the hoops have been properly cleaned, they are again ready for another cheese making operation.

One of the big advantages of our presently disclosed structure is that the requirement for a separate follower has been entirely eliminated and that at the same time the requirement for a separate means for facilitating the removal of the cheeses has also been eliminated. Through the use of a false bottom in our cheese hoop it is not necessary that a sleeve be used in conjunction with the hoop to facilitate the removal of the cheeses. At the same time, the flange 9 and the plate 8 function as a follower just as efficiently as if a separate follower were provided for the cheese making process.

It should be noted that the cheese hoop disclosed and claimed herein is simple in construction and cheap to manufacture. Moreover, because of a minimum number of parts it effects a substantial saving in time and labor since the individual parts can be cleaned in a substantially smaller amount of time. Also, the number of cheeses which can be produced by a cheese maker each day is substantially increased so that a cheese maker, through the use of this equipment, can produce a large quantity of a highly desirable product without requiring an excessive and prohibitive number of employees to convert his cheese curd supply into such cheeses.

It will, of course, be understood that various changes may be made in the form, details, arrangement and proportions of the various parts without departing from the scope of our invention.

What is claimed is:

1. Apparatus for making cheeses including a frusto-conical hoop having imperforate side walls and having its smaller end provided with a bottom and its larger end open, said smaller end having a flange extending radially outwardly from the extreme smaller end thereof only in a plane substantially normal to the longitudinal axis of said hoop and having an external diameter slightly less than the internal diameter of the larger end of said hoop, a second and similar hoop, said bottom and said flange being substantially flat and smooth and cooperatively forming a follower for the compression of cheese curd in said second and similar hoop when aligned longitudinally therewith with the closed end of said first mentioned hoop fitting into the open end of the second hoop.

2. Apparatus for making cheeses including a frusto-conical hoop having imperforate side walls and having its smaller end provided with a detached and removable bottom and its larger end open, a flat annular flange mounted on said smaller end of said hoop and extending radially inwardly and outwardly relative thereto in a plane normal to the longitudinal axis of said hoop, the inwardly extending portion of said flange serving to retain the removable bottom of said hoop within said smaller end, the outer peripheral portions of said annular flange having an external diameter slightly less than the internal diameter of the larger end of said hoop, the outer surface of said removable bottom and said flange forming a follower for the compression of cheese curd in a second and similar hoop when such hoops are aligned longitudinally with the flange of one fitting into the open end of the adjacent hoop and the hoops are urged toward each other and longitudinally thereof.

3. Apparatus for making cheese including a frusto-conical hoop having imperforate side walls and having a smaller end and a larger open end, an annular flange secured to said smaller extreme end of said hoop and extending radially inwardly and outwardly relative thereto in a plane normal to the longitudinal axis of said hoop, the outer circumferential portions of said flange being in non-registering relation with said smaller end of said hoop and a detached panel member of diameter larger than the internal diameter of said annular flange and smaller than the internal diameter of said smaller end of said hoop, said panel member being adapted to be positioned within said hoop in abutting relation to the inwardly extending portion of said flange to form in conjunction therewith a removable bottom for said hoop, the external diameter of said flange being slightly less than the internal diameter of the larger end of said hoop whereby said flange may form in conjunction with said panel member a close-fitting follower for said hoop for the compression of cheese curd in a second and similar hoop when aligned longitudinally with such a hoop with the flanged end of said first mentioned hoop fitting into the open end of the second hoop and the hoops are urged into telescoping relation with each other.

4. Apparatus for making cheeses including a frusto-conical hoop having imperforate side walls and having a smaller end and an open larger end, a flat thin annular ring of greater external and lesser internal diameter than the diameter of said smaller end of said hoop secured to the smaller extreme end of said hoop in position so as to extend radially in a plane normal to the longitudinal axis of said hoop both inwardly and outwardly relative to said smaller end of said hoop, the outer circumferential portions of said ring extending outwardly a substantial distance from said smaller end, a detached flat thin plate of diameter greater than the interior diameter of said ring and of lesser diameter than the interior diameter of said smaller end of said hoop, the exterior diameter of said ring being slightly less than the interior diameter of the open end of said hoop whereby said ring may form in conjunction with said plate a follower for the compression of cheese curd in a second and similar hoop when such hoops are aligned longitudinally with the smaller end of one of such hoops fitting into the open end of the other and when such hoops are moved into telescoping relation.

5. A method of making frusto-conically shaped cheeses with a plurality of frusto-conical hoops of substantially the same dimensions and each having a smaller end and a larger end and a bottom in the smaller end and an outwardly and radially extending flange on that smaller end the diameter of which is slightly less than the internal diameter of the larger end, said method consisting in first filling said hoops to their tops with cheese curd, thereafter aligning said hoops longitudinally with the smaller end of all but one of said hoops extending into the larger and open end of an adjacent hoop without a follower therebetween, and thereafter urging said hoops into telescoping relation with each other whereby the radially extending flange of each of said hoops in conjunction with its bottom will form a follower for the hoop into which it is inserted, maintaining said hoops in said telescoped relation for a substantial period of time, thereafter separating said hoops and then removing the cheeses from said hoops.

6. A method of making frusto-conically shaped cheeses with a plurality of frusto-conical hoops having removable bottoms and having substantially the same dimensions and each having imperforate walls and a flat closed end only slightly smaller in diameter than the internal diameter of its open end, said method consisting in first filling said hoops with cheese curd, then aligning said hoops longitudinally with the smaller end of all but one of said hoops extending into the larger and open end of an adjacent hoop without a separate follower between the cheese curd and the closed smaller end, compressing said hoops longitudinally into further telescoping relation with each other whereby the closed smaller ends of said hoops will constitute followers for the hoops into which they extend and prevent the escape of cheese curd therefrom, maintaining said hoops in said compressed relation for a substantial period of time, thereafter separating said hoops by removing the smaller ends of each of said hoops from the larger end of its adjacent hoop, and forcing the removable bottoms from said hoops toward their open larger ends to thereby free the cheeses therein from the walls of the hoops to permit ready removal of the cheeses from the interior of said hoops for subsequent drying and storage.

7. Apparatus for making cheeses including a frusto-conical hoop having imperforate walls and having its smaller end provided with a detached removable bottom and its larger end open, the smaller extreme end of said hoop having a flat flange extending radially outwardly therefrom in a plane normal to the longitudinal axis of said hoop, said flange having an external diameter only slightly less than the internal diameter of the larger end of said hoop, the outer end surface of said flange and said bottom being substantially flat and smooth and forming a follower for the compression of cheese curd in a second and similar hoop when such hoops are aligned longitudinally with the smaller end of one of the hoops fitting into the larger open end of the other and pressure is applied to telescope the hoops.

References Cited in the file of this patent

UNITED STATES PATENTS

| | | |
|---|---|---|
| 34,241 | Codding | Jan. 28, 1862 |
| 113,809 | Sternberg | Aug. 18, 1871 |
| 185,455 | Roe | Dec. 19, 1876 |
| 929,384 | Brown et al. | July 27, 1909 |
| 1,158,276 | Pieper | Oct. 26, 1915 |
| 1,286,386 | Mixa | Dec. 3, 1918 |
| 2,362,154 | Patrick | Nov. 7, 1941 |
| 2,401,417 | Engle | June 4, 1946 |
| 2,518,188 | Ryser | Aug. 8, 1950 |